United States Patent
Oishi

(10) Patent No.: US 6,968,087 B1
(45) Date of Patent: Nov. 22, 2005

(54) ENCODING APPARATUS, ENCODING METHOD, AND STORAGE MEDIUM

(75) Inventor: Akihiro Oishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 678 days.

(21) Appl. No.: 09/611,270

(22) Filed: Jul. 6, 2000

(30) Foreign Application Priority Data

Jul. 6, 1999 (JP) .................................. 11-192282

(51) Int. Cl.$^7$ ............................................. G06K 9/36
(52) U.S. Cl. ..................................... 382/239; 382/251
(58) Field of Search .......................... 382/232–251, 382/298; 358/1.15; 375/240

(56) References Cited

U.S. PATENT DOCUMENTS 5,301,242 A * 4/1994 Gonzales et al. ........... 382/239
5,426,463 A * 6/1995 Reininger et al. ..... 375/240.03
5,608,654 A * 3/1997 Matsunoshita ............. 358/1.15
6,111,609 A * 8/2000 Stevens ....................... 348/372
6,301,390 B1 * 10/2001 Ikeda et al. ................. 382/232

* cited by examiner

Primary Examiner—Joseph Mancuso
Assistant Examiner—Duy M. Dang
(74) Attorney, Agent, or Firm—Fitzpatrick, Cella, Harper & Scinto

(57) ABSTRACT

In an encoding apparatus or an encoding method, motion-image data is input, an encoding parameter is output such that a predetermined number of codes are used for encoding the input motion-image data in units of predetermined sizes, the output encoding parameter is stored in a storage medium, and the input motion-image data is encoded by adaptively selecting the output encoding parameter or the encoding parameter stored in the storage medium.

11 Claims, 5 Drawing Sheets

ENCODING APPARATUS, ENCODING METHOD, AND STORAGE MEDIUM

BACKGROUND OF THE INVENTION

1. Field of the Invention

The present invention relates to encoding apparatuses and encoding methods suited to encode a digital motion image input from a camera or other device, and also relates to storage media for storing an encoding program for encoding a digital motion image.

2. Description of the Related Art

In a conventional technology, to encode a motion image with the most suitable number of codes at a uniform image quality, tentative encoding is performed first to estimate a suitable number of codes, and then the number of codes estimated in the tentative encoding is used for a next encoding. With this method, a large number of codes can be assigned to a frame which requires a large number of codes, and the number of codes can be reduced for a frame which does not require a large number of codes.

When an image sent from a camera is encoded in real time, there has conventionally been only one method in which a target number of codes is specified for each set of a plurality of frames, a next target number of codes is re-specified by the use of an encoding capacity and the first target number of codes, and the number of codes is set to a constant rate within the set of the plurality of frames.

In the conventional method employing tentative encoding, since encoding is required twice, the method takes twice the amount of time to be performed as compared to that required in conventional encoding techniques, which perform encoding only once.

Moreover, in the conventional method specifying the target number of codes, since the number of codes is set to a constant rate within the set of the plurality of frames, when the input image moves fast or a color band is broad, quantization becomes coarse. As a result, an image having non-uniform frames may be generated. Also, when the input image moves slow, or when a color band is narrow, an undesirably extra number of codes is often used.

SUMMARY OF THE INVENTION

Accordingly, it is an object of the present invention to provide an encoding apparatus and an encoding method which allow a motion image to be encoded in real time with the most suitable number of codes which produce a uniform image quality, and to provide a storage medium for storing an encoding program which achieves the above processing.

The foregoing object is achieved in one aspect of the present invention through the provision of an image encoding apparatus including input means for inputting motion-image data; control means for outputting an encoding parameter such that a predetermined number of codes are used for encoding the input motion-image data in units of predetermined sizes; storage means for storing the encoding parameter output by the control means; and encoding means for encoding the motion-image data input from the input means by adaptively selecting the encoding parameter output from the control means or the encoding parameter stored in the storage means.

The foregoing object is achieved in another aspect of the present invention through the provision of an image encoding method including the steps of inputting motion-image data; outputting an encoding parameter such that a predetermined number of codes are used for encoding the input motion-image data in units of predetermined sizes; storing the output encoding parameter in a storage medium; and encoding the input motion-image data by adaptively selecting the output encoding parameter or the encoding parameter stored in the storage medium.

The foregoing object is achieved in still another aspect of the present invention through the provision of a storage medium for storing a program. The program includes computer-readable code for performing a method comprising the steps of (a) inputting motion-image data; (b) outputting an encoding parameter such that a predetermined number of codes are used for encoding the input motion-image data in units of predetermined sizes; (c) storing the output encoding parameter; and (d) encoding the input motion-image data by adaptively selecting either the encoding parameter output in the outputting step or the encoding parameter stored in the storing step.

Other objects, features and advantages of the present invention will become apparent from the following detailed description taken in conjunction with the accompanying drawings.

DESCRIPTION OF THE PREFERRED EMBODIMENTS

The various embodiments of the present invention will be described below with reference to the drawings.

First Embodiment

Figure 1:
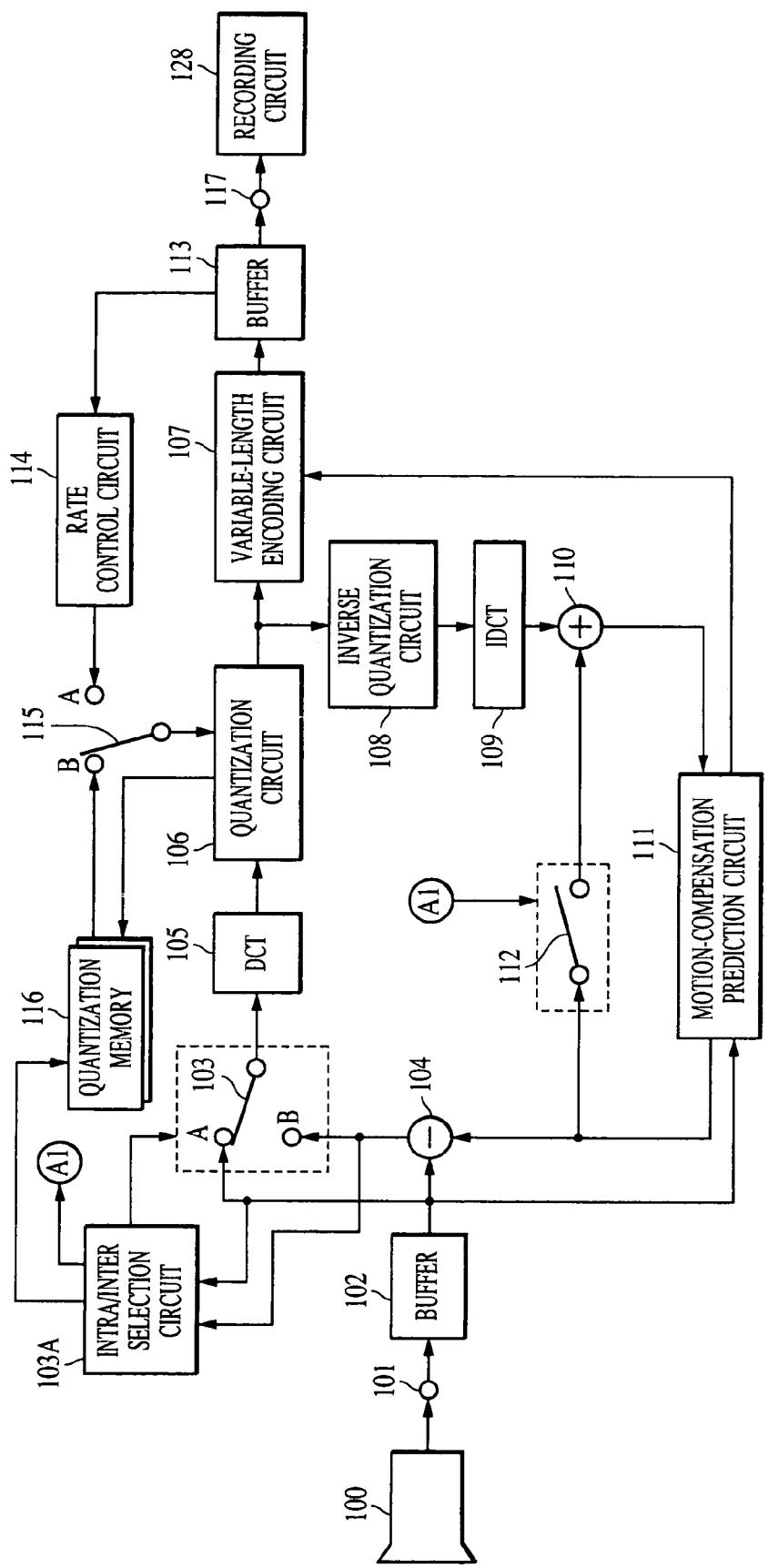
FIG. 1 is a block diagram of an image encoding apparatus according to a first embodiment of the present invention.

FIG. 1 shows a block diagram of an image encoding apparatus according to a first embodiment of the present invention.

In FIG. 1, the image encoding apparatus comprises a video camera 100 for outputting image data, an input terminal 101 for inputting the image data output from the video camera 100, a buffer 102, a switch 103, an intra/inter selection circuit 103A, a subtraction circuit 104, a Direct Cosine Transform (DCT) circuit 105, a quantization circuit 106, a variable-length encoding circuit 107, an inverse quantization circuit 108, and an Indirect Cosine Transform (IDCT) circuit 109. The image encoding apparatus also comprises an adder 110, a motion-compensation prediction circuit 111, a switch 112, a buffer 113, a rate control circuit 114, a switch 115, a quantization memory 116, an output terminal 117, and a recording circuit 128 for recording data output from the output terminal 117 onto a recording medium.

In the present embodiment, encoding processing conforming to the MPEG-1 or MPEG-2 standard is executed by the variable-length encoding circuit 107. Therefore, two types of encoding modes, such as an intra-encoding mode and an inter-encoding mode, are preferably used in the present embodiment. Data included in individual frames is used for encoding during the intra-encoding mode, whereas prediction between frames is used for encoding in the inter-encoding mode.

A frame in which all data is intra-encoded is hereinafter referred to as an I picture, and a frame which can be prediction-encoded using a preceding frame is hereinafter referred to as a P picture. Intra-encoding may be used for a small block (such as a DCT block) in the P picture. A frame which can be prediction-encoded by the use of preceding and subsequent frames is hereinafter referred to as a B picture. Intra-encoding may be used for a small block (such as a DCT block) in the B picture in the same way as for the P picture. I pictures generally appear every predetermined number of frames, and pictures ranging from an I picture to those appearing immediately before a next I picture are hereinafter referred to as a group of pictures (GOP).

One sequence of motion images are divided into GOPs and encoded. For example, the sequence may include pictures I, B, B, P, B, B, P, B, B, P, B, B, P, B, B, I, etc.

Component encoding is applied to one picture, in which the picture signal is divided into a luminance (Y) signal and two color difference (Cb and Cr) signals and encoded. The Cb and Cr signals are sub-sampled horizontally and vertically at a rate which is half of that for the Y signal.

A block formed of eight by eight pixels is preferably used as the minimum encoding unit. DCT is applied in units of blocks. A combination of four adjacent Y-signal blocks, one Cb block, and one Cr block positionally corresponding thereto (totalling six blocks) is referred to as a macroblock (MB), wherein a plurality of macroblocks form a slice, and a picture is formed of slices. The macroblock preferably serves as a minimum unit for motion-compensation prediction. A motion vector is detected in units of macroblocks in motion-compensation prediction. Macroblocks are divided into four types, namely (1) an intra MB, obtained by directly applying DCT to an original signal, (2) a forward MB, obtained by prediction, using a preceding MB only, (3) backward MB, obtained by prediction, using a subsequent MB only, and (4) a bi-predictive MB, obtained by predicting in both directions. An I picture is encoded using only intra MBs. A P picture is encoded by selecting either an intra MB or a forward MB. B pictures are encoded by selecting one of the above-mentioned four MBs.

The operation of the image encoding apparatus shown in FIG. 1 will now be described, separately for I-picture encoding and for P- and B-picture encodings.

In I-picture encoding and P- and B-picture encodings, image data output from the video camera 100 is input to the input terminal 101 and stored in the buffer 102.

When an I picture is to be encoded, as determined by A the circuit 103A based on signals applied thereto, the switch 103 is switched to terminal A by that circuit 103A. As a result, the image data output from the buffer 102 is input to the DCT circuit 105 through the switch 103, and is orthogonally transformed in the DCT circuit 105. The orthogonally transformed image data is then quantized by the quantization circuit 106, and resulting quantized image data is then input to both the inverse quantization circuit 108 and the variable-length encoding circuit 107. The image data which is output from the buffer 102 also is provided to the motion-compensation prediction circuit 111, as can be appreciated in view of FIG. 1.

Within the inverse quantization circuit 108, the quantized data is inverse-quantized by that circuit 108, and is then forwarded to the IDCT circuit 109 wherein the data is then inverse-DCTed to provide IDCT image data. The IDCT image data is then input to the motion-compensation prediction circuit 111 through the adder 110 (switch 112 is open in this case), and the motion-compensation prediction circuit 111 then outputs a prediction image for a next inter-encoding.

Referring now to the variable-length encoding circuit 107, after the quantized data is received by that circuit 107 from the circuit 106, the quantized data is variable-length-encoded by the variable-length encoding circuit 107, and is then input to the buffer 113 for storage therein. Then the image data is output through the output terminal 117 and is recorded on a recording medium by the recording circuit 128.

When a P- or B-picture is to be encoded, as determined by the circuit 103A based on signals applied thereto, the switch 103 is controlled so as to be connected to terminal B. The prediction image output from the motion-compensation prediction circuit 111 is subtracted from the image data output from the buffer 102 in the subtraction circuit 104. This subtraction circuit 104 is provided in order to reduce redundancy in the time-axis direction.

The image data in which redundancy has been reduced in the time-axis direction by the subtraction circuit 104 is then input to the DCT circuit 105 and is orthogonally transformed therein. The orthogonally transformed image data is then provided to the quantization circuit 106 wherein it is quantized and then provided to the inverse quantization circuit 108 and the variable-length encoding circuit 107. The image data output from the buffer 102 also is input to the motion-compensation prediction circuit 111.

Within the inverse quantization circuit 108, the quantized data is inverse-quantized by the inverse quantization circuit 108, and then is IDCTed by the IDCT circuit 109. The resulting IDCT image data is then input to the motion-compensation prediction circuit 111 through the adder 110 when the switch 112 is open. When the switch 112 is closed, the IDCT image data is added to the prediction image output from the motion-compensation prediction circuit 111 by the adder 110 to form a decoded image. This decoded image is then input to the motion-compensation prediction circuit 111 for the next image encoding. The motion-compensation prediction circuit 111 outputs a prediction image for the next inter-encoding, and also outputs a motion vector. The motion vector is input to the variable-length encoding circuit 107.

Two quantization methods will be described next, which are features of the present embodiment.

The description is made for the first N (N$\leq$1) GOPs of data after the start of encoding.

The switch 115 is controlled by controller (not shown) as follows. When encoding is started, the switch 115 is connected to terminal A. To perform encoding at a nearly constant rate in one GOP, the rate control circuit 114 controls the encoding rate.

In this rate control, the target number of codes is specified for each of an I picture, a P picture, and a B picture in advance before encoding the GOPs. The target number of codes is stored in the circuit 114. When the encoded data is input to the buffer 113, the rate control circuit 114 monitors the number of codes of the encoded image input to the buffer 113. When it is determined that the monitored number of codes equals the target number of codes, or is less than that target number of codes, quantization is performed based on predetermined default quantization characteristics, such as predetermined default quantization coefficients.

Figure 2:
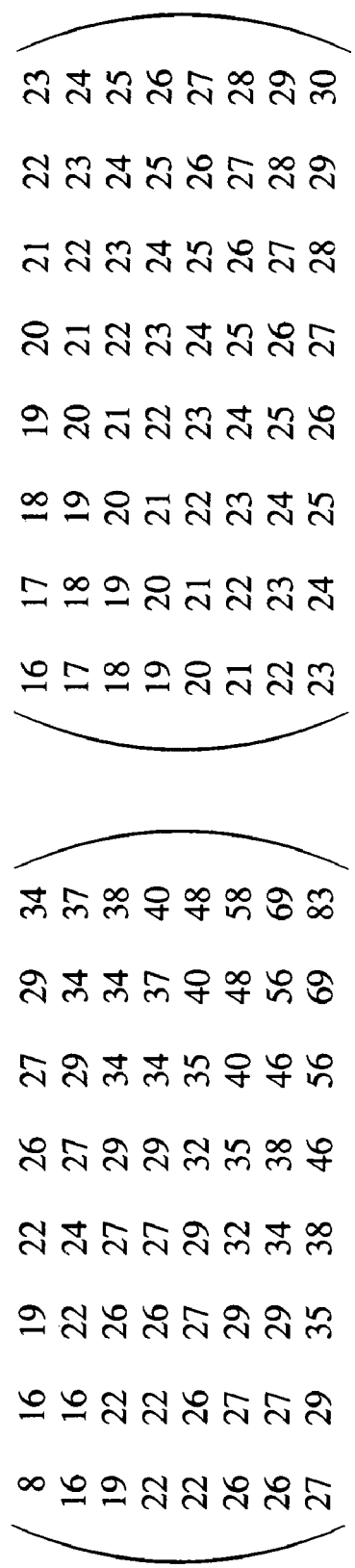
FIG. 2, consisting of FIGS. 2A and 2B, is a view showing exemplary default quantization matrixes used in intra-encoding and inter-encoding operations performed in this invention.

FIGS. 2A and 2B each show an example of a matrix of default quantization coefficients, although it should be noted that coefficients other than those shown in FIGS. 2A and 2B also may be employed. The default quantization coefficients are stored in circuit 114, prior to being used to quantize the data in circuit 106.

When the monitored number of codes is determined by the circuit 114 to be larger than the target number of codes, quantization is performed within the circuit 106, based on larger quantization coefficients being larger than the default quantization coefficients. The larger quantization coefficients are one from a plurality of sets of coefficients stored in the circuit 114. The smaller the quantization coefficients are (the finer the quantization steps are), the lower the compression rate is and the less the image-quality deterioration is. The larger the quantization coefficients are (the coarser the quantization steps are), the higher the compression rate is and the more the image-quality deterioration is.

When encoding is performed at a constant rate in units of GOPs with the use of the rate control circuit 114, the quantization coefficients used in the quantization circuit 106 are stored in the quantization memory 116. The quantization memory 116 is provided for each of the intra-encoding mode and the inter-encoding mode. It is switched according to the encoding mode. The quantization coefficients is selectively input/output from the memory 116, based on whether the inter-encoding mode or intra-encoding mode being implemented.

After N GOPs are encoded, the switch 115 is switched to terminal B. Frame quantization is performed by selecting the most appropriate quantization coefficients (those used before) from the quantization memory 116. In other words, the stored quantization coefficients (those used in the preceding frame) are read from the quantization memory 116 according to the encoding mode selected by the intra/inter selection circuit 103A, and quantization is performed by circuit 106 using the read quantization coefficients.

The selection of the intra-encoding mode or inter-encoding mode will now be described. The intra/inter selection circuit 103A selects either intra-encoding mode or the inter-encoding mode.

The intra/inter selection circuit 103A compares the amount of data sent from the buffer 102 with the amount of data sent from the subtraction circuit 104, and selects whichever amount is smaller. When it is determined that the amount of data from the buffer 102 is smaller, the switch 103 is switched to terminal A, and thus the intra-encoding mode is selected. When it is determined that the amount of data from the subtraction circuit 104 is smaller, the switch 103 is switched to terminal B, and thus the inter-encoding mode is selected.

The switch 112 is either opened or closed according to the selection of the encoding mode in the intra/inter selection circuit 103A. More specifically, when the intra/inter selection circuit 103A selects the intra-encoding mode, the switch 112 is controlled so as to be placed in an open position. When the inter-encoding mode is selected, on the other hand, the switch 112 is controlled so as to be placed in a closed position.

The intra/inter selection circuit 103A also controls the selection of the quantization characteristic (coefficients) stored in the quantization memory 116. The intra/inter selection circuit 103A controls the switches 103 and 112 such that the intra-encoding mode is set in units of a predetermined number of frames.

With the above method and apparatus, a motion image having a uniform image quality can be encoded in real time.

Second Embodiment

Figure 3:
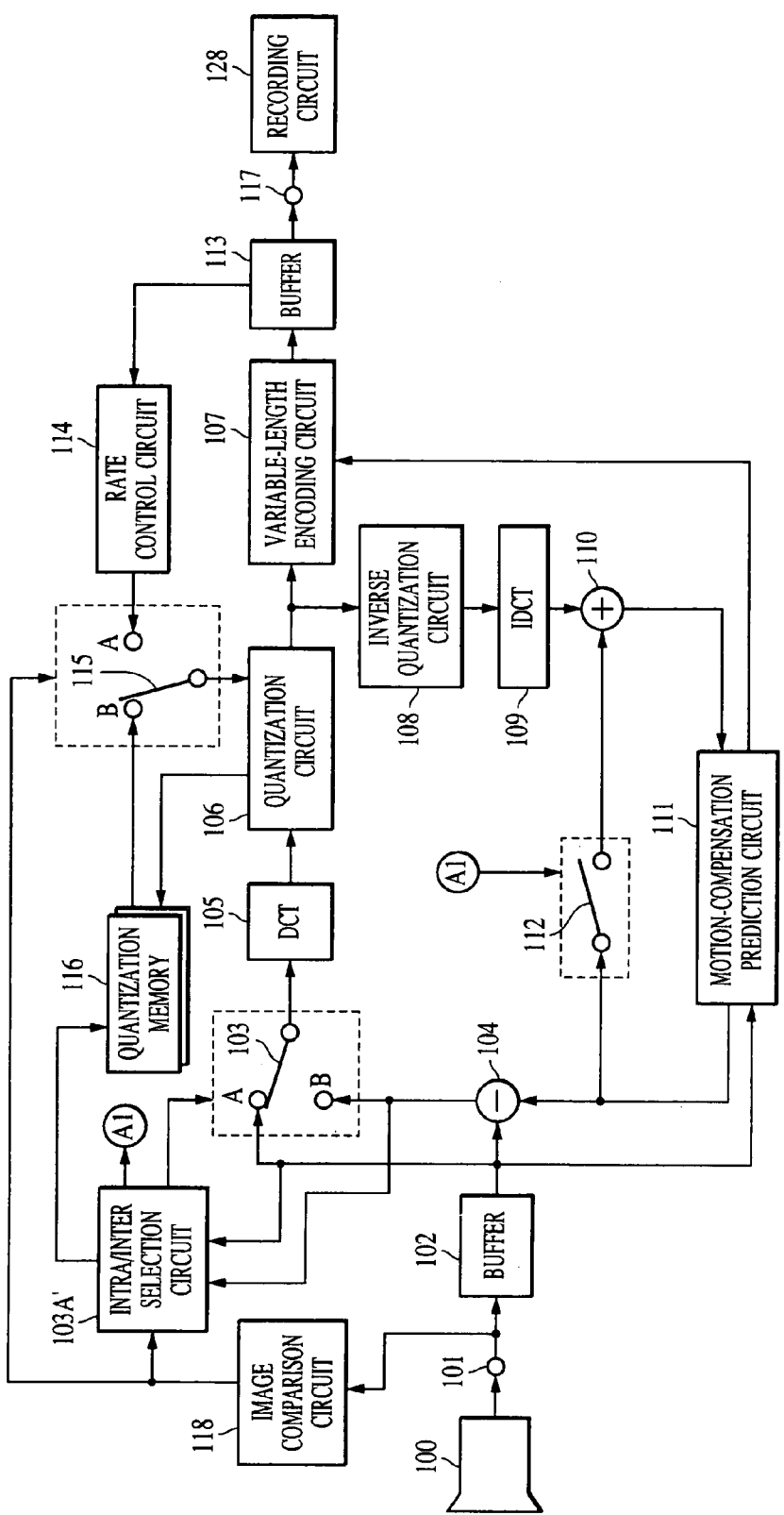
FIG. 3 is a block diagram of an image encoding apparatus according to a second embodiment of the present invention.

FIG. 3 is a block diagram of an image encoding apparatus according to a second embodiment of the present invention. In FIG. 3, the same symbols as those used in FIG. 1 are assigned to components which operate in the same manner as those shown in FIG. 1, and thus further descriptions thereof will be omitted.

In FIG. 3, an image comparison circuit 118 is added to the structure shown in FIG. 1.

The operation of the image encoding apparatus shown in FIG. 3 will now be described.

Image data output from a video camera 100 is input to an input terminal 101, and then is sent to a buffer 102 and to the image comparison circuit 118. The image comparison circuit 118 holds the image in the preceding frame, and compares the luminance signal and the color difference signals between the current frame and the preceding frame. If it is determined in the comparison that the current frame is substantially different from the preceding frame (i.e., values of the luminance and color difference signals from the current and preceding frames differ by at least a respective predetermined threshold value), the switch 115 is switched to side A by the circuit 118, and quantization-coefficient control is performed by rate control circuit 114.

The output signal of the image comparison circuit 118 is also input to an intra/inter selection circuit 103A'. When the output signal indicates that the current frame is substantially different than the preceding frame, the switch 103 is connected to side A by the circuit 103A' in order to execute intra-encoding, and the switch 112 is controlled so as to be placed in an open position to start a new GOP.

With the above operation, since the quantization characteristic of the preceding frame is not used for a completely different image, image-quality deterioration is prevented.

Since encoding in the apparatus of FIG. 3 is performed in the same manner as in the first embodiment, a detailed description thereof will be omitted herein.

Third Embodiment

Figure 4:
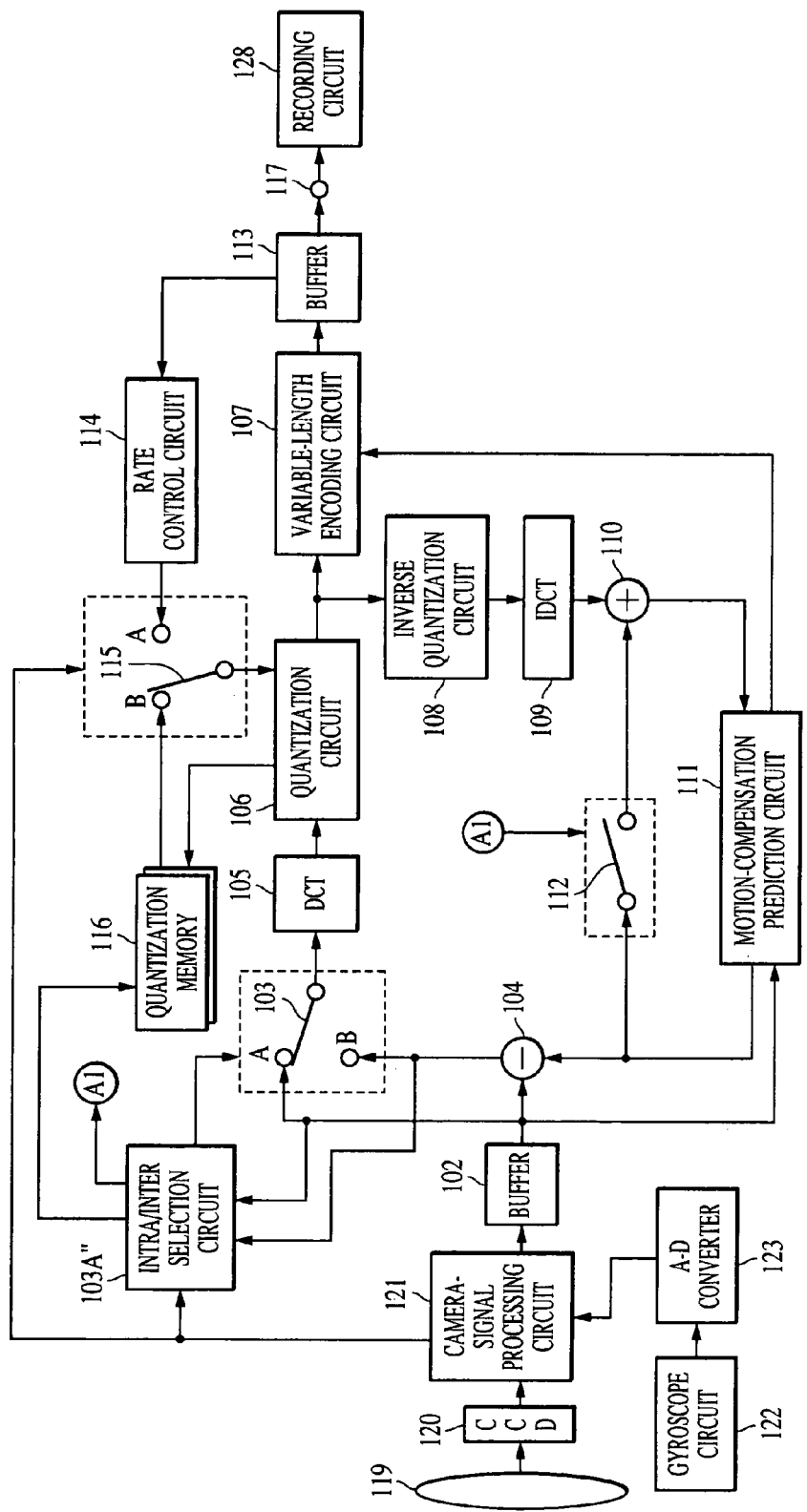
FIG. 4 is a block diagram of an image encoding apparatus according to a third embodiment of the present invention.

FIG. 4 is a block diagram of an image encoding apparatus according to a third embodiment of the present invention. In FIG. 4, the same symbols as those used in FIG. 1 are assigned to components which operate in the same manner as those shown in FIG. 1, and further detailed descriptions thereof will be omitted. In the present embodiment, the present invention is applied to a video camera, and the elements shown in FIG. 4 are included in the camera (not shown) although in other embodiments, those elements may be included in an external device associated with the camera.

In FIG. 4, a lens 119, a CCD 120 serving as a capturing device, a camera-signal processing circuit 121, a gyroscope circuit 122 which operates in a known manner by outputting a signal in response to a movement of the camera, and an A-D converter 123, are added to the structure shown in FIG. 1.

The operation of the image encoding apparatus shown in FIG. 4 will now be described.

In both I-picture encoding and in P- and B-picture encoding, an image input from the lens 119 is converted to a digital signal in the CCD 120, and then is input to the camera-signal processing circuit 121. The camera-signal processing circuit 121 performs a calculation based upon information received from the CCD 120 and gyroscope circuit 122 by way of the A-D circuit 122, to determine a degree and direction of movement of the camera, and performs a calculation based upon the determined degree and direction of movement of the camera to determine a compensation value. The circuit 121 also corrects the image data received from CCD by using the compensation value and outputs the corrected image data to the buffer 102.

According to the method described in the first embodiment, a motion image having a uniform image quality is encoded in real time. When a camera is used for capturing an image, if a large movement occurs in the camera as a result of, for example, shaking in the hands of an operation, or a quick panning is performed, a whole screen is greatly changed.

In the present embodiment, when the camera-signal processing circuit 121 determines that most of the screen has changed, by recognizing that the degree of movement of the camera exceeds a predetermined threshold degree, switch 115 controlled by circuit 121 so as to be connected to terminal A, and the number-of-codes control is executed in the above-described manner to perform encoding at a nearly constant rate within one GOP. After N GOPs are encoded, the switch 115 is switched to terminal B. Frame quantization is performed by selecting the quantization coefficients (those used before) from the quantization memory 116.

In the present embodiment, when the camera-signal processing circuit 121 determines that most of the screen has been changed, the result of the determination is also input to the intra/inter selection circuit 103A". When encoding of an I picture or a P picture is finished, the switch 103 is controlled by the circuit 103A" so as to be connected to terminal A, and the switch 112 is controlled by the circuit 103A" so as to be placed in an open position to start a new GOP.

Since the operation of encoding in the present embodiment is the same as that in the first embodiment, a detailed description thereof will be omitted herein.

Fourth Embodiment

Figure 5:
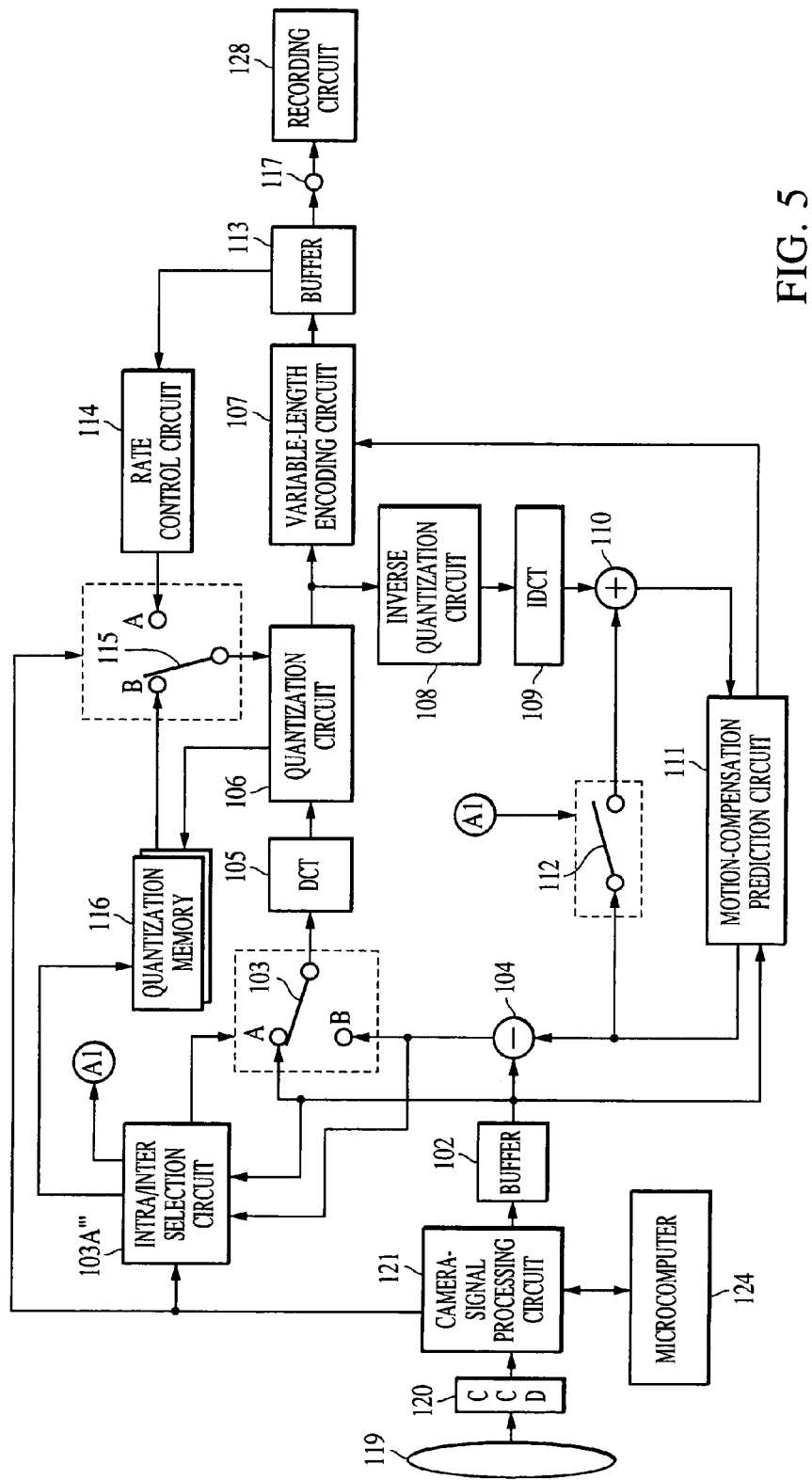
FIG. 5 is a block diagram of an image encoding apparatus according to a fourth embodiment of the present invention.

FIG. 5 is a block diagram of an image encoding apparatus according to a fourth embodiment of the present invention. In FIG. 5, the same symbols as those used in FIG. 4 are assigned to components which operate in the same manner as those shown in FIG. 4, and detailed descriptions thereof will be omitted.

In FIG. 5, a microcomputer 124 is used instead of the gyroscope circuit 122 and the A-D converter 123 used in FIG. 4. The microcomputer 124 controls various camera-related functions, including, for example, change in an iris of the camera and a zooming (lens focal length) of the camera, and outputs information indicating those changes, as well as information representing light levels perceived by the camera.

The operation of the image encoding apparatus shown in FIG. 5 will now be described.

The camera-signal processing circuit 121 determines a compensation value by performing a calculation using an input digital image signal, and outputs image data in the same way as in the third embodiment.

In addition, in the present embodiment, the camera-signal processing circuit 121 calculates a change of white balance (light intensity level), a change of the iris, and a change of zooming (lens focal length) according to information sent from the microcomputer 124. When it is determined that white balance has changed, the iris has changed, or zooming has changed, by more than a corresponding predetermined threshold value, the switch 115 is controlled so as to be switched to terminal A thereof, and encoding is performed at a nearly constant rate within one GOP. After N GOPs are encoded, the switch 115 is switched to terminal B. Frame quantization is performed by selecting the quantization coefficients (those used before) from the quantization memory 116.

In the present embodiment, when it is determined that white balance has changed, the iris has changed, or zooming has changed, by more than a corresponding predetermined threshold value, the result of the determination is also input to an intra/inter selection circuit 103A'". When encoding of an I picture or a P picture is finished, the switch 103 is controlled so as to be connected to terminal A thereof, and the switch 112 is controlled so as to be placed in an open position to start a new GOP.

Since the operation of encoding in the present embodiment is the same as that in the first embodiment, a detailed description thereof will be omitted.

Other Embodiments

A storage medium according to other embodiments of the present invention will be described next.

Each of the embodiments shown in FIG. 1, FIG. 3, FIG. 4, and FIG. 5 can be configured by hardware. It can also be configured by a computer system having a CPU and a memory. When the computer system is used, the memory serves as a storage medium according to the present invention. The storage medium stores a program for executing the operation described in each of the above embodiments.

The storage medium can be, for example, a semiconductor memory, such as a ROM or a RAM, an optical disk, a magneto-optical disk, or a magnetic-recording medium. The storage medium can be used as a CD-ROM, a floppy disk, a magnetic card, magnetic tape, or a non-volatile memory card.

Therefore, when the storage medium is used in a system other than those shown in FIG. 1, FIG. 3, FIG. 4, and FIG. 5, or a computer, and the system or the computer reads a program code stored in the storage medium and executes it, the same functions as those implemented in the above embodiments are provided, the same advantages are obtained, and the object of the present invention is achieved.

Furthermore, the same functions as those implemented in the above embodiments are provided, the same advantages are obtained, and the object of the present invention is achieved, when the operating system running on the computer performs part or all of the above-described processing operations, or when the program code read from the storage medium is written into a memory provided for an extension function board inserted into the computer or an extension function unit connected to the computer, and the CPU provided for the extension function board or the extension function unit performs part or all of the above-described processing operations.

As described above, according to the above embodiments, a motion image is encoded in real time at a uniform image quality with the most appropriate number of codes.

Since encoding is performed only once unlike conventional methods employing tentative encoding, the processing time is reduced.

In the conventional method in which the target number of codes is specified, if an input image has a fast motion or if a color band is broad, quantization becomes coarse. This drawback is solved by the present invention.

In other words, the foregoing description of embodiments has been given for illustrative purposes only, and is not to be construed as being limited only to the specific examples described above.

The scope of the invention is, therefore, to be determined solely by the following claims, and is not necessarily limited by the text of the specifications, and alterations made within a scope equivalent to the scope of the claims fall within the true spirit and scope of the invention.

What is claimed is:

1. An image encoding apparatus, comprising:
    an input device for inputting motion-image data;
    a quantizer for quantizing the inputted motion-image data, based on quantization coefficient information applied to an input of said quantizer;
    an encoder for encoding image data quantized by said quantizer to output corresponding encoded image data including a number of codes;
    a rate control circuit for determining whether or not the number of codes included in the encoded image data exceeds a predetermined threshold value, and for outputting a selected one of a plurality of first sets of quantization coefficients, based on a result of that determination;
    a memory storing a plurality of second sets of quantization coefficients; and
    a selector for selecting either the first set of quantization coefficients output by said rate control circuit or one of the second sets of quantization coefficients stored in said memory, and applying the selected set of quantization coefficients to the input of said quantizer, to cause said quantizer to quantize the inputted motion-image data, based on that selected set of quantization coefficients.

2. An image encoding apparatus according to claim 1, wherein, for a predetermined number of frames of the inputted motion-image data, said selector selects the set of first-quantization coefficients output by said rate control circuit, and applies that selected set of first quantization coefficients to the input of said quantizer, to enable said quantizer to quantize the inputted motion-image data based on that set of first quantization coefficients, and wherein for subsequent frames of the inputted motion-image data, said selector selects one of the sets of second quantization coefficients and applies that selected set of second quantization coefficients to the input of said quantizer, to enable said quantizer to quantize the inputted motion-image data based on that selected set of second quantization coefficients.

3. An image encoding apparatus according to claim 1, further comprising a detector for detecting a change in adjacent frames included in the inputted motion-image data, wherein said selector selects either the set of first quantization coefficients output by said rate control circuit or one of the sets of second quantization coefficients stored in said memory, based on an output of said detector.

4. An image encoding apparatus according to claim 3, wherein said input device comprises an image capturer for capturing images that are in view of the image capturer to input the motion-image data, and said detector detects the change in the adjacent frames included in the inputted motion-image data based on an output of said image capturer.

5. An image encoding apparatus according to claim 3, wherein said encoder encodes the image data quantized by said quantizer according to either an inter-encoding technique or an intra-encoding technique, depending on a selection made by said selector.

6. An image encoding apparatus according to claim 5, wherein said selector selects the set of first quantization coefficients for a predetermined number of frames of the inputted motion-image data, to cause said encoder to encode the image data quantized by said quantizer according to the intra-encoding technique.

7. An image encoding apparatus according to claim 1, further comprising a detector for detecting at least one of a change of a white balance in the inputted motion-image data, a change in an iris, and a zooming change, wherein said selector selects either the set of first quantization coefficients output by said rate control circuit or one of the sets of second quantization coefficients stored in said memory, based on an output of said detector.

8. An image encoding apparatus according to claim 1, further comprising a recorder for recording the encoded image output by said encoder.

9. An image encoding apparatus according to claim 1, wherein said encoder encodes the image data quantized by said quantizer in accordance with at least one of the MPEG-1 standard and the MPEG-2 standard.

10. A method for encoding motion-image data, comprising the steps of:
    inputting motion-image data;
    providing a set of quantization coefficients to a first input of a quantizer;
    applying the inputted motion-image data to a second input of the quantizer to cause the quantizer to quantize the inputted motion-image data based on the set of quantization coefficients provided to the first input of the quantizer, and outputting resulting quantized image data;
    encoding image data quantized by the quantizer to provide encoded image data including a number of codes;
    determining whether or not the number of codes included in the encoded image data exceeds a predetermined threshold value, and selecting one of a plurality of provided sets of first quantization coefficients, based on a result of that determination; and
    selecting either the selected one of the provided sets of first quantization coefficients or one of a plurality of provided sets of second quantization coefficients, and applying that selected set of quantization coefficients to the first input of the quantizer to cause the quantizer to quantize the inputted motion-image data based on that selected set of quantization coefficients.

11. A storage medium storing a program having computer-readable code for executing a method for encoding motion-image data, the method comprising the steps of:
    inputting motion-image data;
    providing a set of quantization coefficients to a first input of a quantizer;
    applying the inputted motion-image data to a second input of the quantizer to cause the quantizer to quantize the inputted motion-image data based on the set of quantization coefficients provided to the first input of the quantizer, and outputting resulting quantized image data;
    encoding image data quantized by the quantizer to provide encoded image data including a number of codes;

determining whether or not the number of codes included in the encoded image data exceeds a predetermined threshold value, and selecting one of a plurality of provided sets of first quantization coefficients, based on a result of that determination; and selecting either the selected one of the provided sets of first quantization coefficients or one of a plurality of provided sets of second quantization coefficients, and applying that selected set of quantization coefficients to the first input of the quantizer to cause the quantizer to quantize the inputted motion-image data based on that selected set of quantization coefficients.

* * * * *